United States Patent
Lai et al.

(10) Patent No.: US 7,849,123 B2
(45) Date of Patent: Dec. 7, 2010

(54) PIPELINE-BASED RECONFIGURABLE MIXED-RADIX FFT PROCESSOR

(75) Inventors: Chi-Chen Lai, Taichung (TW); Wei Hwang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 941 days.

(21) Appl. No.: 11/650,557

(22) Filed: Jan. 8, 2007

(65) Prior Publication Data

US 2008/0155003 A1 Jun. 26, 2008

(30) Foreign Application Priority Data

Dec. 21, 2006 (TW) .............................. 95148299 A

(51) Int. Cl.
*G06F 17/14* (2006.01)
(52) U.S. Cl. ...................... 708/404; 708/400; 708/409
(58) Field of Classification Search ........................ None
See application file for complete search history.

(56) References Cited

U.S. PATENT DOCUMENTS

| | | | | |
|---|---|---|---|---|
| 4,872,132 A | * | 10/1989 | Retter ........................ | 708/505 |
| 5,163,017 A | * | 11/1992 | Wong et al. .................. | 708/406 |
| 5,293,330 A | * | 3/1994 | Sayegh ........................ | 708/406 |
| 5,481,488 A | * | 1/1996 | Luo et al. .................... | 708/404 |
| 6,366,936 B1 | * | 4/2002 | Lee et al. ..................... | 708/404 |
| 2002/0083107 A1 | | 6/2002 | Park et al. .................... | 708/404 |
| 2005/0015420 A1 | | 1/2005 | Gibb et al. ................... | 708/404 |
| 2005/0114420 A1 | * | 5/2005 | Gibb et al. ................... | 708/404 |

OTHER PUBLICATIONS

Luca Fanucci, Massimiliano Forliti and Filippo Gronchi, "Single-Chip Mixed-Radix FFT Processor for Real-Time On-Board SAR Processing", IEEE, 0-7803-5682-9/99, 1999, pp. 1135-1138.

Thuyen Le, Thomas Dombek and Manfred Glesner, "On the Design of a Novel Architecture for Shape-Adaptive DCT Targeting Image Coding", IEEE, 0-7803-5682-9/99, 1999, pp. 1139-1142.

M. Hasan, T. Arslan and J.S. Thompson, "A Delay Spread Based Low Power Reconfigurable FFT Processor Architecture for Wireless Receivers", IEEE, 0-7803-8160-2/03, 2003, pp. 135-138.

* cited by examiner

*Primary Examiner*—Lewis A Bullock, Jr.
*Assistant Examiner*—Michael Yaary
(74) *Attorney, Agent, or Firm*—Jackson IPG PLLC; Demian K. Jackson

(57) ABSTRACT

The present invention discloses a fast Fourier transform (FFT) processor based on multiple-path delay commutator architecture. A pipelined architecture is used and is divided into 4 stages with 8 parallel data path. Yet, only three physical computation stages are implemented. The process or uses the block floating point method to maintain the signal-to-noise ratio. Internal storage elements are required in the method to hold and switch intermediate data. With good circuit partition, the storage elements can adjust their capacity for different modes, from 16-point to 4096-point FFTs, by turning on or turning off the storage elements.

6 Claims, 23 Drawing Sheets

| FFT size | Stage 1 | Stage 2 | Stage 3 | Stage 4 |
|---|---|---|---|---|
| 16 | | | 8 | 2 |
| 32 | | | 8 | 4 |
| 64 | | | 8 | 8 |
| 128 | | 8 | 8 | 2 |
| 256 | | 8 | 8 | 4 |
| 512 | | 8 | 8 | 8 |
| 1024 | 8 | 8 | 8 | 2 |
| 2048 | 8 | 8 | 8 | 4 |
| 4096 | 8 | 8 | 8 | 8 |

FIG.2

| FFT size | RB_4096 | RB_512 | RB_64 |
|---|---|---|---|
| 16 | | | 16 |
| 32 | | | 32 |
| 64 | | | 64 |
| 128 | | 128 | 16 |
| 256 | | 256 | 32 |
| 512 | | 512 | 64 |
| 1024 | 1024 | 128 | 16 |
| 2048 | 2048 | 256 | 32 |
| 4096 | 4096 | 512 | 64 |

FIG. 4

| BF Mode | ENA | ENB |
|---|---|---|
| Radix-8 BF | 0 | 0 |
| 2 parallel radix-4 BF | 1 | 0 |
| 4 parallel radix-4 BF | X | 1 |

FIG. 8

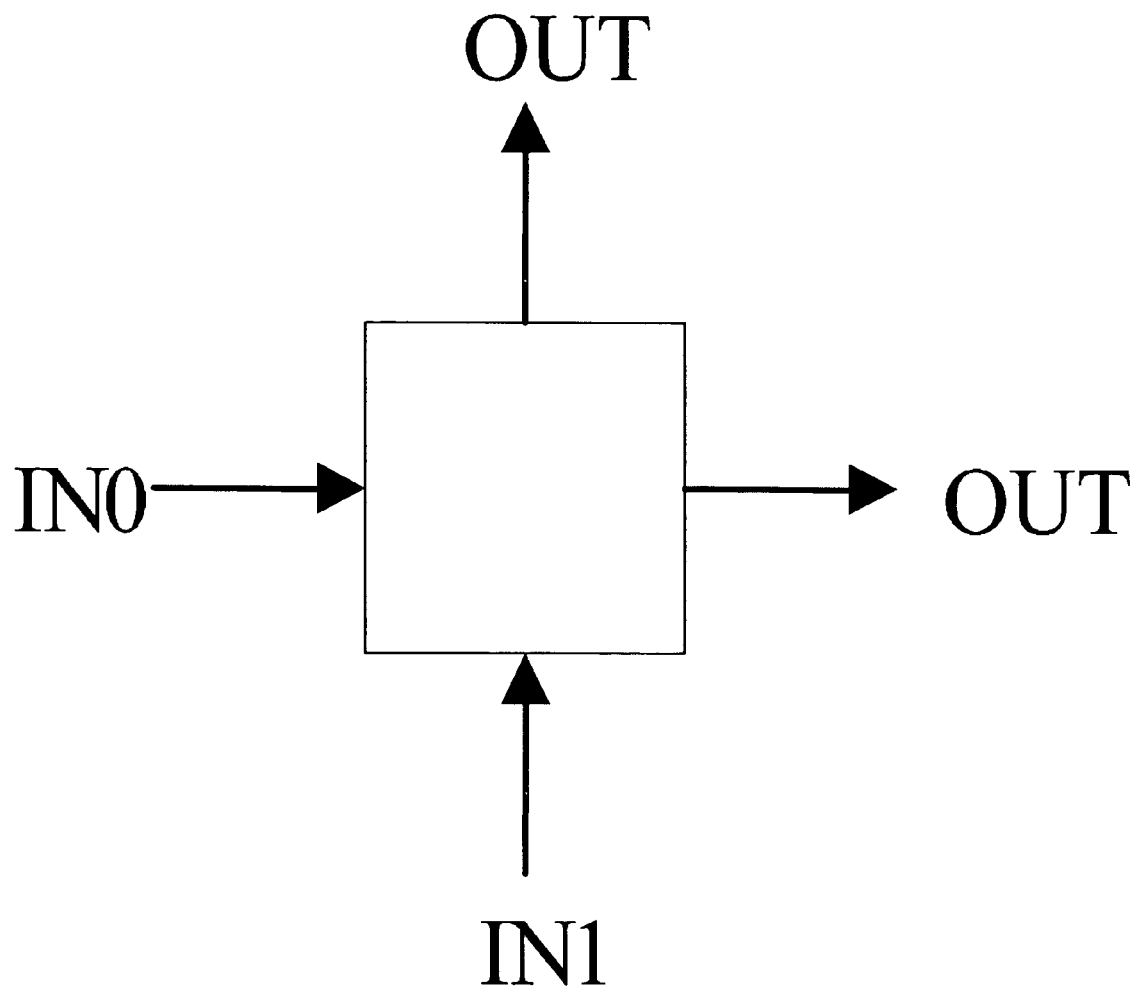
F I G . 9 i = 0
PHASE = 1

| | | | | | | |
|---|---|---|---|---|---|---|
| | | | | | | |
| | | | | | | 0 |
| | | | | | | |
| | | | | | | 16 |
| | | | | | | |
| | | | | | | 32 |
| | | | | | | |
| | | | | | | 48 |
| | | | | | | |
| | | | | | | 64 |
| | | | | | | |
| | | | | | | 80 |
| | | | | | | |
| | | | | | | 96 |
| | | | | | | |
| | | | | | | 112 |

FIG. 13A i = 1
PHASE = 1

FIG. 13B i = 2
PHASE = 1

| | | | | | | | |
|---|---|---|---|---|---|---|---|
| | | | | | | 0 | |
| | | | | | | 1 | 2 |
| | | | | | | 16 | |
| | | | | | | 17 | 18 |
| | | | | | | 32 | |
| | | | | | | 33 | 34 |
| | | | | | | 48 | |
| | | | | | | 49 | 50 |
| | | | | | | 64 | |
| | | | | | | 65 | 66 |
| | | | | | | 80 | |
| | | | | | | 81 | 83 |
| | | | | | | 96 | |
| | | | | | | 97 | 98 |
| | | | | | | 112 | |
| | | | | | | 113 | 114 |

FIG. 13C i = 1 4
P H A S E = 1

| 113 | 112 | 97 | 96 | 81 | 80 | 65 | 64 | 49 | 48 | 33 | 32 | 17 | 16 | 1 | 0 |
|---|---|---|---|---|---|---|---|---|---|---|---|---|---|---|---|
| 115 | 114 | 99 | 98 | 83 | 82 | 67 | 66 | 51 | 50 | 35 | 34 | 19 | 18 | 3 | 2 |
| 117 | 116 | 101 | 100 | 85 | 84 | 69 | 68 | 53 | 52 | 37 | 36 | 21 | 20 | 5 | 4 |
| 119 | 118 | 103 | 102 | 87 | 86 | 71 | 70 | 55 | 54 | 39 | 38 | 23 | 22 | 7 | 6 |
| 121 | 120 | 105 | 104 | 89 | 88 | 73 | 72 | 57 | 56 | 41 | 40 | 25 | 24 | 9 | 8 |
| 123 | 122 | 107 | 106 | 91 | 90 | 75 | 74 | 59 | 58 | 43 | 42 | 27 | 26 | 11 | 10 |
| 125 | 124 | 109 | 108 | 93 | 92 | 77 | 76 | 61 | 60 | 45 | 44 | 29 | 28 | 13 | 12 |
| 126 |  | 110 |  | 94 |  | 78 |  | 62 |  | 46 |  | 30 |  | 14 |  |

FIG.13D j = 0
i = 15

PHASE = 1 → 0

| 113 | 112 | 97 | 96 | 81 | 80 | 65 | 64 | 49 | 48 | 33 | 32 | 17 | 16 | 1 | 0 |
|---|---|---|---|---|---|---|---|---|---|---|---|---|---|---|---|
| 115 | 114 | 99 | 98 | 83 | 82 | 67 | 66 | 51 | 50 | 35 | 34 | 19 | 18 | 3 | 2 |
| 117 | 116 | 101 | 100 | 85 | 84 | 69 | 68 | 53 | 52 | 37 | 36 | 21 | 20 | 5 | 4 |
| 119 | 118 | 103 | 102 | 87 | 86 | 71 | 70 | 55 | 54 | 39 | 38 | 23 | 22 | 7 | 6 |
| 121 | 120 | 105 | 104 | 89 | 88 | 73 | 72 | 57 | 56 | 41 | 40 | 25 | 24 | 9 | 8 |
| 123 | 122 | 107 | 106 | 91 | 90 | 75 | 74 | 59 | 58 | 43 | 42 | 27 | 26 | 11 | 10 |
| 125 | 124 | 109 | 108 | 93 | 92 | 77 | 76 | 61 | 60 | 45 | 44 | 29 | 28 | 13 | 12 |
| 127 | 126 | 111 | 110 | 95 | 94 | 79 | 78 | 63 | 62 | 47 | 46 | 31 | 30 | 15 | 14 |

FIG. 13E j = 1
PHASE = 0

| 113 | 112 | 97 | 96 | 81 | 80 | 65 | 64 | 49 | 48 | 33 | 32 | 17 | 16 | 1 |
|-----|-----|----|----|----|----|----|----|----|----|----|----|----|----|----|
| 115 | 114 | 99 | 98 | 83 | 82 | 67 | 66 | 51 | 50 | 35 | 34 | 19 | 18 | 3 |
| 117 | 116 | 101 | 100 | 85 | 84 | 69 | 68 | 53 | 52 | 37 | 36 | 21 | 20 | 5 |
| 119 | 118 | 103 | 102 | 87 | 86 | 71 | 70 | 55 | 54 | 39 | 38 | 23 | 22 | 7 |
| 121 | 120 | 105 | 104 | 89 | 88 | 73 | 72 | 57 | 56 | 41 | 40 | 25 | 24 | 9 |
| 123 | 122 | 107 | 106 | 91 | 90 | 75 | 74 | 59 | 58 | 43 | 42 | 27 | 26 | 11 |
| 125 | 124 | 109 | 108 | 93 | 92 | 77 | 76 | 61 | 60 | 45 | 44 | 29 | 28 | 13 |
| 127 | 126 | 111 | 110 | 95 | 94 | 79 | 78 | 63 | 62 | 47 | 46 | 31 | 30 | 15 |

FIG. 13F

PIPELINE-BASED RECONFIGURABLE MIXED-RADIX FFT PROCESSOR

FIELD OF THE INVENTION

The present invention relates to a processor; more particularly, relates to designing a fast Fourier transform processor in the digital signal processing domain.

DESCRIPTION OF THE RELATED ARTS

A discrete Fourier transform (DFT) is widely employed in analyses, designs, and implementations of signal processing algorithms and systems. Yet, a computational complexity of direct evaluation of an N-point DFT is $O(N^2)$, which results in a long computation time and excessive hardware cost. However, considerable symmetry exists in operations and coefficients required to compute a DFT. Such symmetry is exploited to reduce the number of operations required and thus reduces the time required for FFT computation. Collectively, the resulting efficient computation algorithms are called fast Fourier transform (FFT).

Mainly, the FFT is a way of computing the DFT by decomposing the computation into successively smaller DFT computations. In this process, both the symmetry and the periodicity of the complex exponential $W_N^{nk}=e^{-j(2\pi/N)nk}$ are exploited. Algorithms in which the input sequence x[n] is decomposed into successively smaller subsequences are called decimation-in-time (DIT) algorithms. Alternatively, algorithms dividing output sequence X[k] into smaller subsequences are called decimation-in-frequency (DIF) algorithms. By far, the most common algorithm for FFT is the Cooley-Tukey algorithm, which is suitable in decomposing DFT that has a size of power of 2.

The DFT of a complex data sequence x[n] having a length N is defined as:

$$X(k) = \sum_{n=0}^{N-1} x[n]W_N^{nk} \quad k = 0, 1, \ldots, N-1, \qquad \text{Eq. (1)}$$

where the coefficient $W_N^{nk}$ is defined as $W_N^{nk}=e^{-j2\pi nk}$ and is called a twiddle factor. An approach used to improve an efficiency of FFT is to exploit the symmetry and the periodicity properties of:

$W_N^{(N-n)k}=W_N^{-nk}=(W_N^{nk})^*$ (Symmetry property)

$W_N^{nk}=W_N^{n(k+N)}=W_N^{(n+N)k}$ (Periodicity in n and k)

As an illustration, using the periodicity property, terms in Eq. (1) are group ws for n and (n+N):

$x[n]W_N^{nk}+x[n+N]W_N^{(n+N)k}=(x[n]+x[n+N])W_N^{nk}$

Similar groupings can be used for other terms in Eq. (1). In this way, the number of complex multiplication can be reduced by approximately a factor of 2. Even more, the real and imaginary parts of certain factors has values of 1 or 0, which eliminating the need for multiplication. As a result, applying the above properties achieves significantly reduction in computation.

The FFT architecture is a way to implement a signal flow graph of the FFT algorithms. There are two popular architectures for implementing the FFT algorithms for real time applications. They are pipeline-based architecture and memory-based architecture.

The pipeline-based architecture has a high regularity and is easily called and parameterized in implementation. On comparing to the memory-based architecture, it is characterized in a high throughput rate while keeping moderating hardware complexity. An efficient method to obtain the pipe line-based architecture to project the signal flow graph of the FFT algorithm to a hardware data flow. Then, two common pipeline based architectures are introduced, a single-path delay feedback (SDF) architecture and a multiple-delay commutator (MDC) architecture.

A block diagram of the SDF architecture in a radix-2 DIF algorithm is shown in FIG. 16. When the FFT length N is 16, there are 4 butterfly stages [71] in a signal flow graph (SFG). As shown in the figure, a butterfly element [72] is dedicated to each stage. And feedback registers [73] are used to store output data of the butterfly elements [72]. The butterfly elements [72] perform butterfly operations when required data are ready at input ports; otherwise, swap operations are performed to store data into the feedback registers [73]. Memory requirement of the SDF architecture is minimal. However, a utilization rate of the butterfly elements [72] and multiplier units only achieves 50%.

Similar to the radix-2 SDF architecture, an SDF architecture for a radix-4 algorithm is also derived from the SFG. Compared to the radix-2 architecture, the radix-4 architecture implements the FFT with fewer computation stages. However, butterfly units are designed with more computation.

The MDC approach is much more straightforward than the SDF approach. In butterfly units in SFG, parallel data paths are used. Instead of using delay feedback registers, delay elements [81] are placed on the data paths. Between computation stages, a commutator [82] is used to switch data to correct positions. FIG. 17 shows a block diagram for the radix-2 DIF MDC architecture. The throughput rate of the radix-2 MDC architecture is twice to that of the radix-2 SDF architecture due to the parallel data paths. However, the memory requirement is bigger than that of the SD F architecture and extra commutators [82] are required.

The radix-4 MDC architecture uses the same principle as the radix-2 M DC architecture. In the radix-4 MDC architecture, higher throughput rate is achieved due to the four parallel data paths. However, more memory requirement and higher hardware complexity are the overhead in return.

A memory-based architecture is considered the most area efficient way for implementing the FFT. It usually consists of one computation block, a coefficient memory for twiddle factors, and a memory to store IO and internal data. A feature of such an architecture is that it usually uses few butterfly elements, even only one, as the computation block. Since the butterflies and multipliers usually occupy most area and consume a great amount of power in the pipeline-based architecture, the memory-based architecture reduces hardware cost and lowers power consumption.

FIG. 18 shows the generic block diagram of the memory-based architecture. The hardware complexity of the memory-based architecture concentrates on the control block [9]. Since there are few or even only one butterfly elements available, the execution order is stage by stage as in the SFG. The memory-based architecture usually uses one memory module [92] to store the intermediate data. Since the data ordering is different from stage to stage, the order of data stored in the memory has to be taken care after every stage of operation.

Although the number of butterfly units available is reduced, the number of butterflies on the SFG is still the same. Therefore, the memory-based architecture results in low through put rate. In a radix-r algorithm, an N-point FFT requires $$\frac{N}{r} \times \log_r N$$

times of radix-r butterfly operation. When a memory access bandwidth is K and a time for a butterfly operation is t, a time for computing an N-point FFT is expressed $$\frac{N}{r} \times \log_r N \times \frac{r}{K} \times t = \frac{N}{K} \times \log_r N \times t.$$

From the above equation, it shows that the time for computing a FFT is reduced linearly with K and exponentially with r. Therefore, using a high radix algorithm is an efficient way to raise throughput rate of a memory-based architecture.

A n FFT processor performing various lengths of FFT is usually preferred. For the pipeline-based architecture, reconfiguration is easily achieved according to principle of the FFT algorithm. The idea is to break the N-point DFT into smaller DFT sets recursively. Therefore, after a radix-r butterfly stage, the N-point FFT is decomposed into r sets of N/r-point FFT. Since the pipeline-based architecture is a projection of the SFG, backend stages actually only calculate the FFTs of smaller sizes. Therefore, the pipeline-based architecture is reconfigured for calculating FFT of smaller size by feeding input data directly into later stages.

However, such a reconfiguration requires lots of multiplexers when a higher flexibility is demanded in the FFT size. Moreover, the multiplexers added between each stage not only increase the overhead on area and power, but also influence speed performance of the architecture. Hence, the prior arts do not fulfill users' requests on actual use.

SUMMARY OF THE INVENTION

The main purpose of the present invention is to decompose N-point FFT into at most four computation stages to save computing time and hardware cost through using a first general butterfly, a second general butterfly and a reconfigurable butterfly while reusing the first general butterfly.

To achieve the above purpose, the present invention is a pipeline-based reconfigurable mixed-radix FFT processor, comprising a first commutator; a first multiplexer connecting to the first commutator; a first general butterfly connecting to the first multiplexer; a multiplier connecting to the first general butterfly; a memory unit connecting to the multiplier; a first register bank connecting to the multiplier and the first multiplexer; a first Block Floating Point (BFP) unit connecting to the first register bank; a second register bank connecting to the multiplier; a third register bank connecting to the multiplier; a second BFP unit connecting to the second register bank and the third register bank; a second multiplexer connecting to the second register bank and the third register bank; a third multiplexer connecting to the first commutator and the second multiplexer; a second general butterfly connecting to the third multiplexer; a coefficient multiplier connecting to the second general butterfly; a fourth register bank connecting to the coefficient multiplier; a fifth register bank connecting to the coefficient multiplier; a third BFP unit connecting to the fourth register bank and the fifth register bank; a fourth multiplexer connecting to the fourth register bank and the fifth register bank; a reconfigurable butterfly connecting to the fourth multiplexer; and a second commutator connecting to the reconfigurable butterfly. Accordingly, a novel pipeline-based reconfigurable mixed-radix FFT processor is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the structural view showing the preferred embodiment according to the present invention;

FIG. 2 is the block diagram showing the preferred embodiment;

FIG. 4 is the view showing the required storage numbers of storage elements for various N-point FFT;

FIG. 8 is the view showing the relationship between control signals and there configurable butterfly;

FIG. 9 and FIG. 10 are the views showing the block diagram of the two-input register;

Figure 13A:
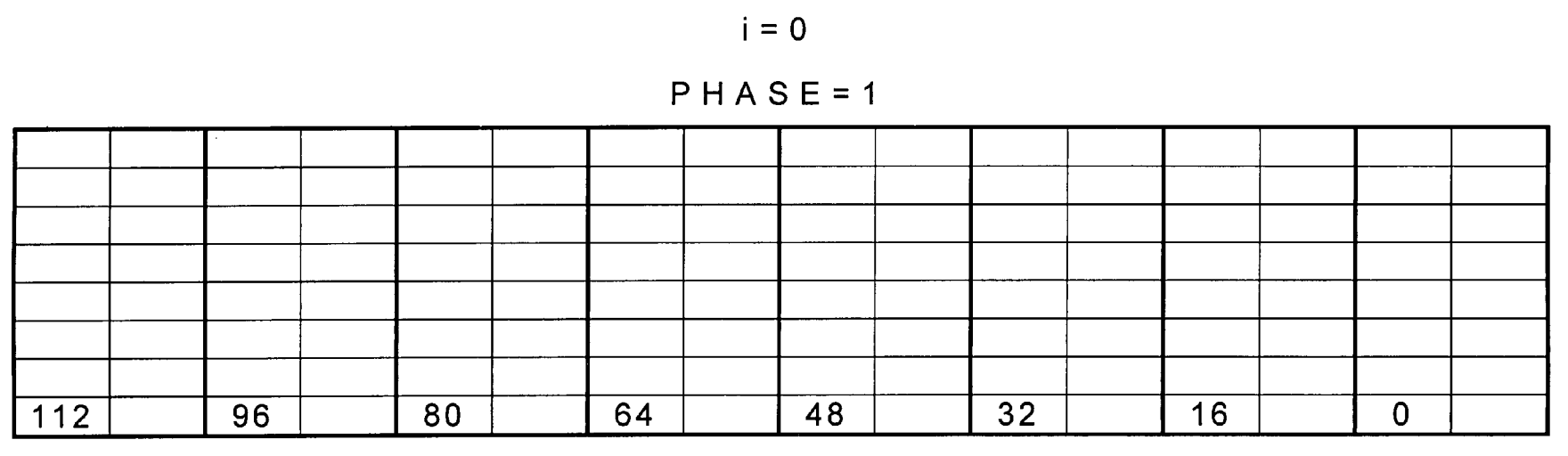
Figure 13B:
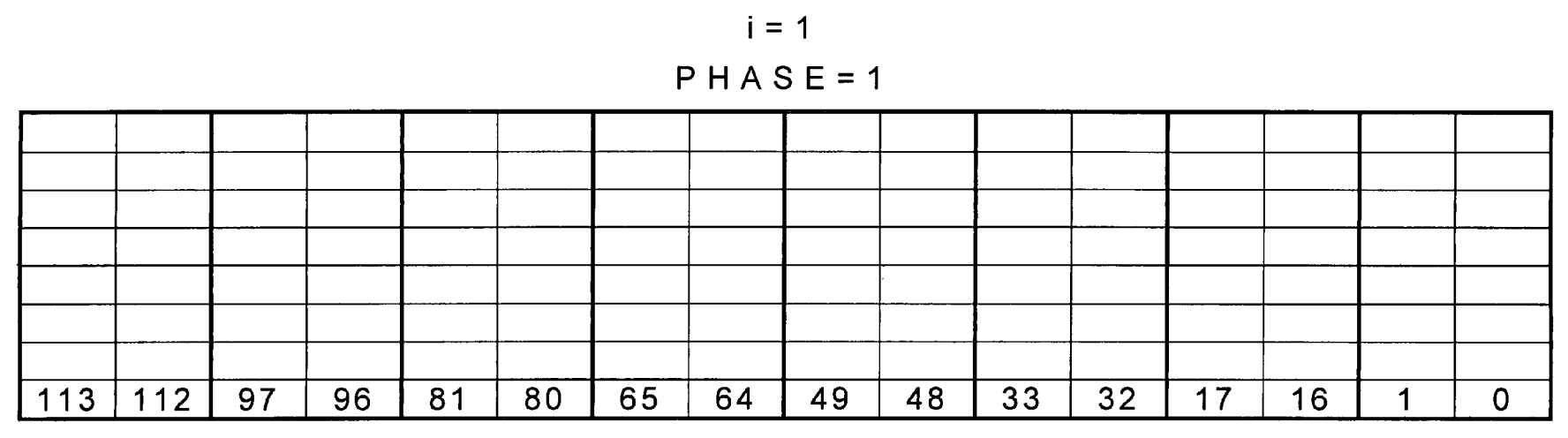

FIG. 13A to FIG. 13F are the views showing the data flow of the register bank for 128-word mode;

DESCRIPTION OF THE PREFERRED EMBODIMENT

Figure 1:
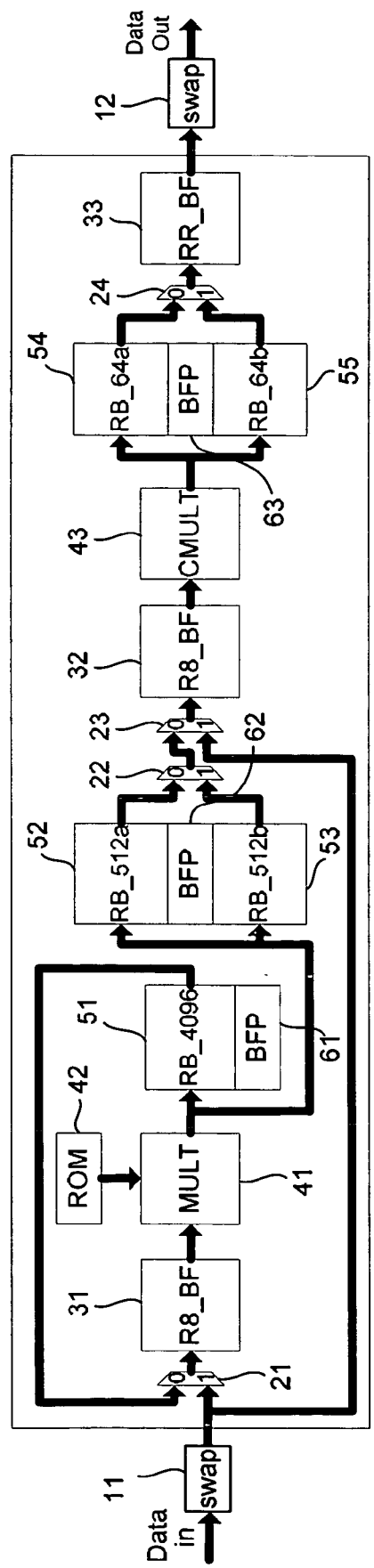

The following description of the preferred embodiment is provided to understand the features and the structures of the present invention.

Please refer to FIG. 1 to FIG. 15 which, according to a preferred embodiment of the present invention, are a structural view and a block diagram of the preferred embodiment; views showing a block diagram of a 128-point fast Fourier transform (FFT) and a required number of storage elements for various N-point FFT; a view showing the circuit diagram of multiplication by $1/\sqrt{2}$; views showing block diagrams of a general radix-8 butterfly and a reconfigurable butterfly; a view showing a relationship between control signals and the reconfigurable butterfly; views showing block diagrams of a two-input register and an RB_64 with various capacity; views showing data flows of an register bank for 16-word mode and 128-word mode; a view showing control zones of the register bank; and a view showing a block diagram of a reconfigurable RB_512. As shown in the figures, the present invention is a pipeline-based reconfigurable mixed-radix FFT processor, comprising a first commutator [11], a second commutator [12], a first multiplexer [21], a second multiplexer [22], a third multiplexer [23], a fourth multiplexer [24], a first general butterfly [31], a second general butterfly [32], a reconfigurable butterfly [33], a multiplier [41], a memory unit [42], a coefficient multiplier [43], a first register bank [51], a second register bank [52], a third register bank [53], a fourth register bank [54], a fifth register bank [55], a first Block Floating Point (BFP) unit [61], a second BFP unit [62] and a third BFP unit [63].

The first multiplexer [21] is connected with the first commutator [11]; the first general butterfly [31] is connected with the first multiplexer [21]; the multiplier [41] is connected with the first general butterfly [31]; the memory unit [42] is connected with the multiplier [41]; the first register bank [51] is connected with the multiplier [41] and the first multiplexer [21]; the first BFP unit [61] is connected with the first register bank [51]; the second register bank [52] is connected with the multiplier [41]; the third register bank [53] is connected with the multiplier [41]; the second BFP unit [62] is connected with the second register bank [52] and the third register bank [53]; the second multiplexer [22] is connected with the second register bank [52] and the third register bank [53]; the third multiplexer [23] is connected with the first commutator [11] and the second multiplexer [22]; the second general butterfly [32] is connected with the third multiplexer [23]; the coefficient multiplier [43] is connected with the second general butterfly [32]; the fourth register bank [54] is connected with the coefficient multiplier [43]; the fifth register bank [55] is connected with the coefficient multiplier [43]; the third BFP unit [63] is connected with the fourth register bank [54] and the fifth register bank [55]; the fourth multiplexer [24] is connected with the fourth register bank [54] and the fifth register bank [55]; the reconfigurable butterfly [33] is connected with the fourth multiplexer [24]; and the second commutator [12] is connected with the reconfigurable butterfly [33].

The present invention performs FFT having a length from 16-point to 4096-point by the first general butterfly [31], the second general butterfly [32] and the reconfigurable butterfly [33], where the FFT length has a size of power of 2.

The present invention decomposes an N-point FFT into at most four sub-FFTs having various points, where numbers of the points are powers of 2 and N is the multiplication product of the numbers. Although the N-point FFT has several possible ways of decomposition, the present invention assigns a specific algorithm having mixed radixes for the N-point FFT. The part using a higher radix is executed in a prior phase in the algorithm and is a radix-8 based algorithm; and the part having fewer points is realized by passing preceding stages.

For example, the 512-point FFT is decomposed by the radix-8 algorithm into three stages and four-stage pipeline thus becomes unnecessary. In such a case one of the four stages is bypassed to have an 8×8×8 algorithm, instead of assigning an 8×8×4×2 algorithm or other four-stage decomposition. Radix smaller than 8 is arranged at the last stage and the last stage is a reconfigurable butterfly stage while other stages are radix-8 under all modes. The resulting radix arrangement is shown in FIG. 2. As shown in FIG. 2, four-stage butterflies is required when the FFT has a size of {1024, 2048, 4096} points. Meanwhile, FFTs having a size of {128, 256, 512} points need three-stage butterflies and FFTs having a size of {16, 32, 64} points need only two-stage butterflies.

Figure 6:
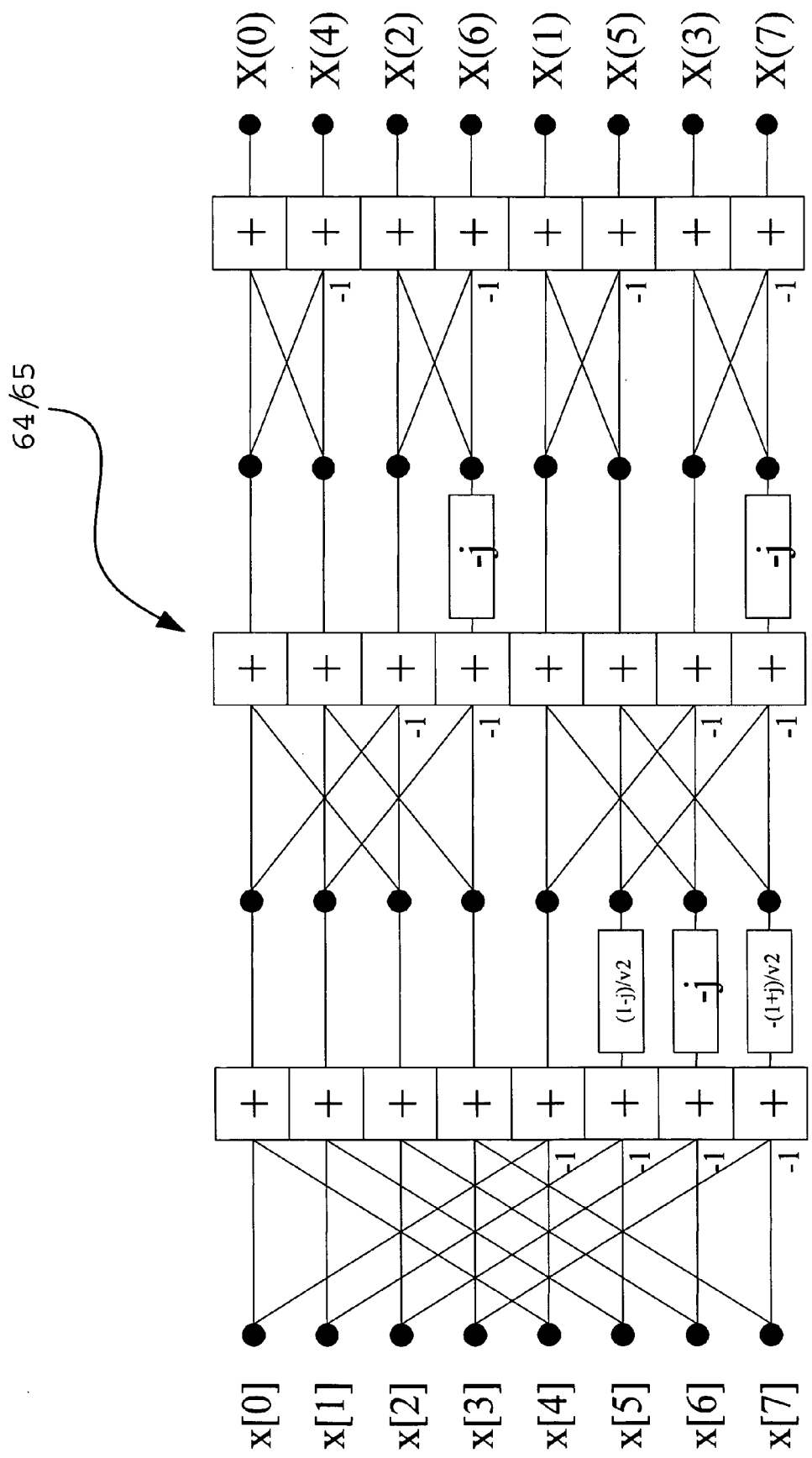
FIG. 6 is the view showing the block diagram of the general radix-8 butterfly.

Hence, in the present invention, basic butterfly units are thus radix-2, radix-4, and radix-8 butterflies. Based on the decimation-in-frequency decomposition, SFG of the 8-point DFT is shown in FIG. 6. There is no explicit multiplication operation in realization of an 8-point DFT. The trivial multiplications of $\pm j$, $(1-j)/\sqrt{2}$, and $-(1+j)/\sqrt{2}$ are realized by using only shift-and-add operation. And the 8-point DFT is a combination of two parallel 4-point DFTs if the first stage is neglected; or, is a combination of four parallel 2-point DFTs if the first two stages are neglected. Therefore, the radix-8 butterfly can also be served as radix-4 and radix-2 butterfly as well. A side advantage is that the width of data path remains 8-data when goes from radix-8 to a lower radix stage.

For circuit implementation, overflow has to be prevented. For every fixed-point addition of M bits, for example, storage elements with (M+1)-bit width are required to store the result. However, a result is eventually rounded to M bits and therefore quantization errors are generated. An analysis of signal quality measured by the signal-to-quantization noise ratio (SNR) shows that each step of rounding reduces the SNR accordingly. That is, the signal-to-noise ratio decreases according to following $N^2$, or decreases 1 bit per stage. After every radix-2 butterfly stage, 1 extra bit is added to the length of storage elements in order to maintain the same noise-to-signal ratio.

In the present invention, the first BFP unit [61], the second BFP unit [62] and the third BFP unit [63] are used to minimize the quantization error. The incoming data are partitioned into non-overlapping blocks; and, depending upon a data sample having a highest magnitude in each block, a common exponent is assigned to the block. The original block is normalized to the word with largest magnitude in the block and a scaling factor k is obtained. Then the fixed-point computation is proceeded with the normalized data. When all the data in the block is done with the computation, the whole block of data is shifted back to the original precision point according to the scaling factor previously obtained. Thus, BFP out performs fixed-point, since its input signals are always block normalized.

Figure 3:
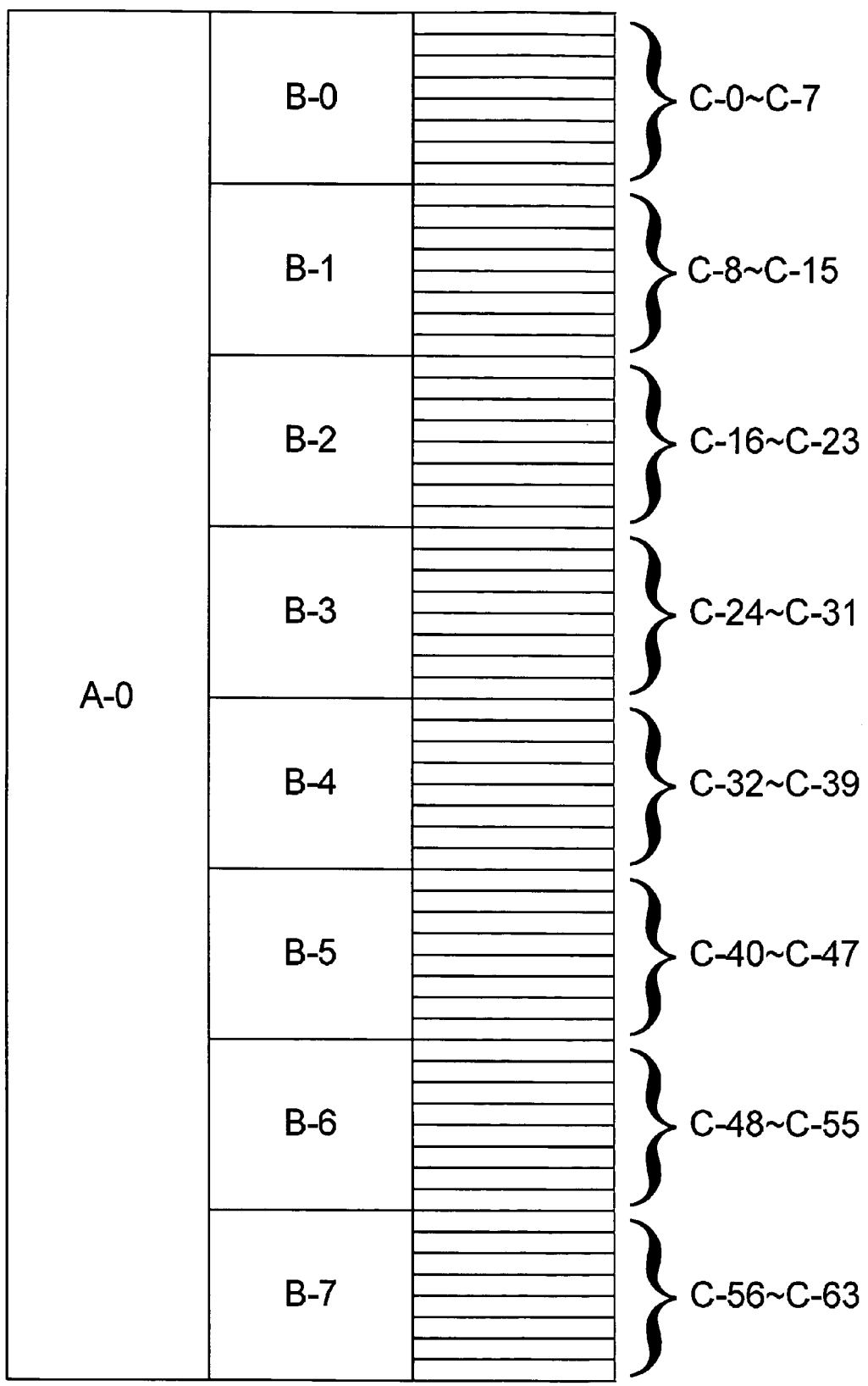
FIG. 3 is the view showing the block diagram of the 128-point FFT.

In order to adopt BFP through the first BFP unit [61], the second BFP unit [62] and the third BFP unit [63], the execution is divided into blocks first. In FIG. 3, an example of how the blocks are arranged is shown when 128-point FFT is calculated. The data is divided into r group after a radix-r butterfly stage. The required data for butterfly stages afterward only come from its own group or the previously block. In FIG. 3, the data are separated into B-0~B-7 after the first radix-8 butterfly stage. The calculation beginning from B-0 only involves the data of B-0. That is, the operation of block C-0~C-7 needs no data from B-1~B-7. Here, B-0 is the supply block of C-0~C-7 and A-0 is the supply block of B-0~B-7.

To adopt the BFP method, execution order of blocks thus follows two rules. First, an execution of a certain block does not start before its supply block is finished. Secondly, the execution order of each stage is from top to bottom.

After the calculation of a certain block, the data coming out from the block are evaluated to obtain a scaling factor. According to the factor, the data are scaled before going into a next stage operation. The scaling factors are stored as a table during execution. The final scaling factor for the output is the sum of scaling factors of all its supply blocks. The final scaling factors are required to shift the data back to the coordinate precision as the FFT input. Namely, outputs calling factor f or C-0 block is the sum of scaling factors of block A-0 and B-0; and the output scaling factor for C-8 is the sum of scaling factors of block A-0 and B-1, etc.

Number of storage elements required in register banks [51, 52, 53, 54, 55] to store the intermediate data between each stage is related to the block size respectively. FIG. 4 shows the required storage elements between stages for each FFT size. Take the 128-point FFT for example. There are three computation stages for the 128-point FFT in the mixed-radix algorithm according to the present invention. For the first stage, the 128 data must be computed before any computation of the second stage starts. Therefore, 128 storage elements are required between the first two stages. In the second stage, the 128 points are divided into eight 16-points by the radix-8 decomposition, and now the block size becomes 16 data. Again, 16 storage elements are required between the second stage and the last stage.

The width of the data path is 8 words (points). Each word represents a complex number n data, which consists of a real-part and an imaginary-part. Each part has a 16-bit width. And the n the data path is 8 (word)×2 (part)×16 (bit)=256 bits wide. The reconfigurable architecture has four butterfly computation stages while the architecture in the figure shows only three. This is because the first two butterfly computation stages are combined as one. As shown in FIG. 2, the first butterfly stage is enabled only for 1024, 2048, or 4096-point FFT. As block execution order explained previously, the first butterfly stage and the second butterfly stage in a signal flow graph is not overlapped in calculation since the second butterfly stage does not start until the first butterfly stage is totally completed. Therefore, these two computation stages share the same hardware, which is the first general butterfly [31].

In overall architecture, there are two kind of butterfly required. One is a general radix-8 butterfly, including the general butterflies [31, 32], which performs an 8-point DFT operation. The other is the reconfigurable butterfly [33] that can be reconfigured as a radix-2, radix-4 or radix-8 butterfly respectively. As shown in FIG. 2, only the last butterfly stage is a reconfigurable butterfly [33] (RR_BF) while the rest uses general radix-8 butterflies [31,32] (R8_BF). Between computation stages, the first register banks [51], the second register banks [52], the third register banks [53], the fourth register banks [54] and the fifth register banks [55] are used to store and switch internal data.

Figure 5:
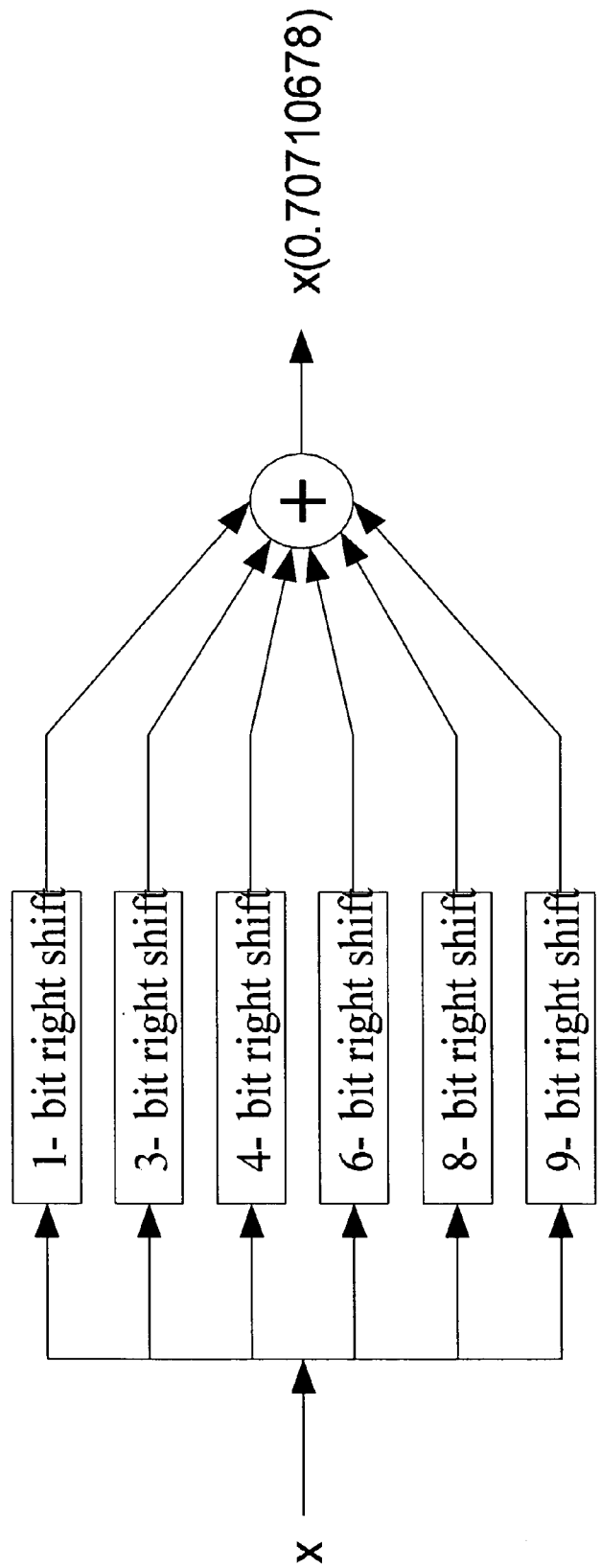
FIG. 5 is the view showing the circuit diagram of multiplication by $1/\sqrt{2}$.

As explained earlier, the multiplications involved in the general radix-8 butterfly are trivial, which are multiplications by ±j, (1−j)/√2, and −(1+j)/√2. The multiplication of ±j is simply sign and real/imaginary part adjustment; and multiplication of 1/√2 is implemented as shown in FIG. 5. Therefore, these multiplications requires only some shift-and-add, swap, and sign-changing operations. Without any true multiplier, it is possible to carried out the whole 8-point DFT in one clock cycle, as shown in FIG. 6. The 8-point DFT is implemented in a fully paralleled at a path. And the internal word length of these units is 16-bit, which is the same as input word length.

Figure 7:
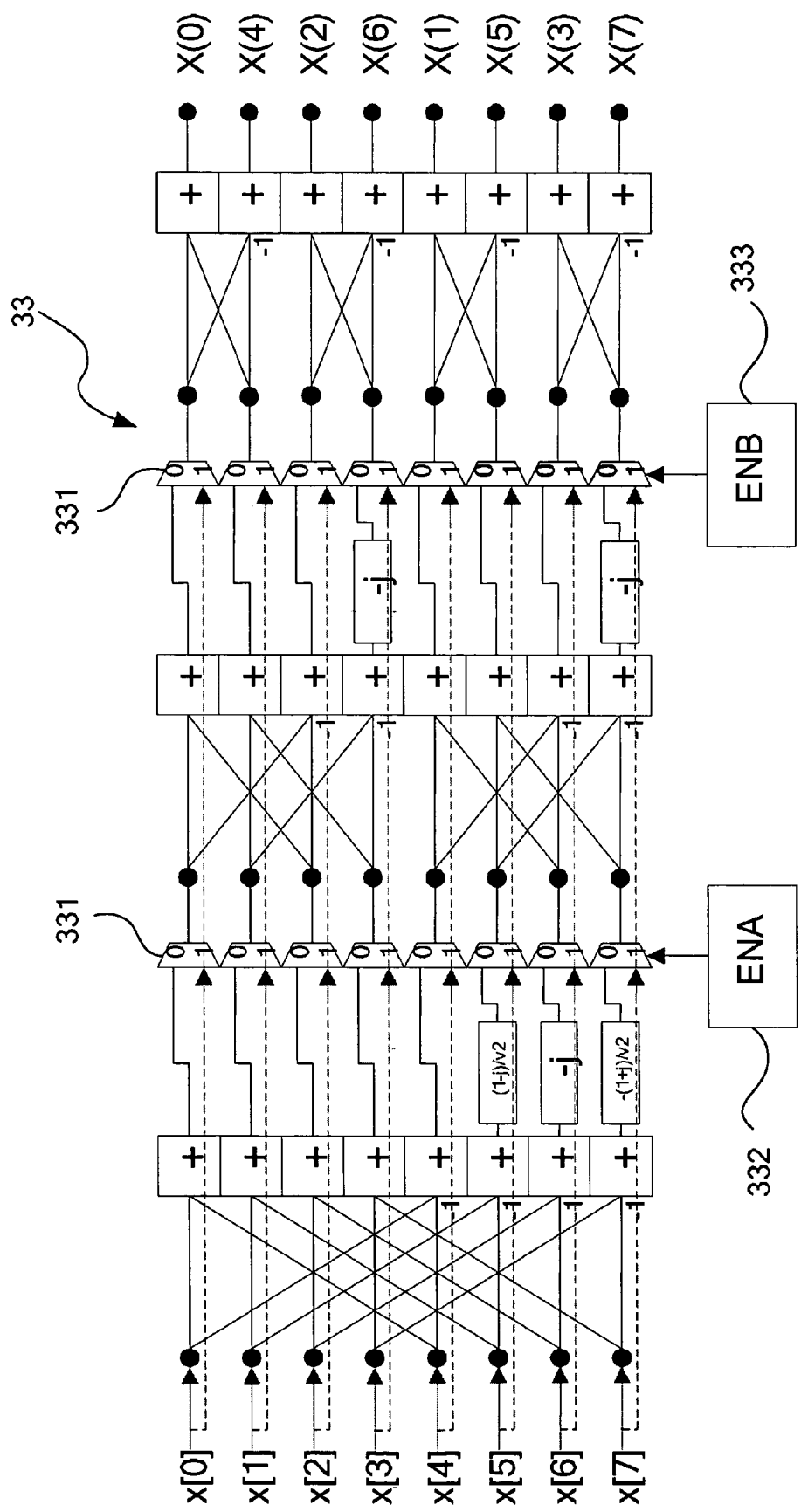
FIG. 7 is the view showing the block diagram of the reconfigurable butterfly.

On implementing the reconfigurable butterfly [33], as shown in FIG. 7, the block diagram of the reconfigurable butterfly 33 looks like a general radix-8 butterfly [31,32] very much except that multiplexers are inserted between every two stages. For the three-stage partition, there are two columns of multiplexers present, controlled by ENA [332] and ENB [333] respectively. The multiplexers select data from previous stage or data from the first butterfly [31] or the second butterfly [32]. When the reconfigurable butterfly [33] acts as a radix-8 butterfly, both. ENA [332] and ENB [333] are set to 0. When the reconfigurable butterfly [33] acts as a radix-4 butterfly, EN A [332] is set to 1 and ENB [333] is set to 0. When the reconfigurable butterfly [33] acts as a radix-2 butterfly, only the last stage is required for calculation and thus only EN B [333] is required to be set to 1. The relation between control signals and operation mode is shown FIG. 8.

For each reconfigurable FFT mode, the number of storage elements in register banks [51, 52, 53, 54, 55] varies according to different FFT length. Redundant storage elements should be able to be fully turned off while the reconfigurable FFT requires lower storage capacity. Therefore, a good circuitry partition is required in designing the reconfigurable butterfly. Furthermore, the register banks [51, 52, 53, 54, 55] also has the responsibility for reordering the data sequence before outputting data to next computation stage.

Figure 10:
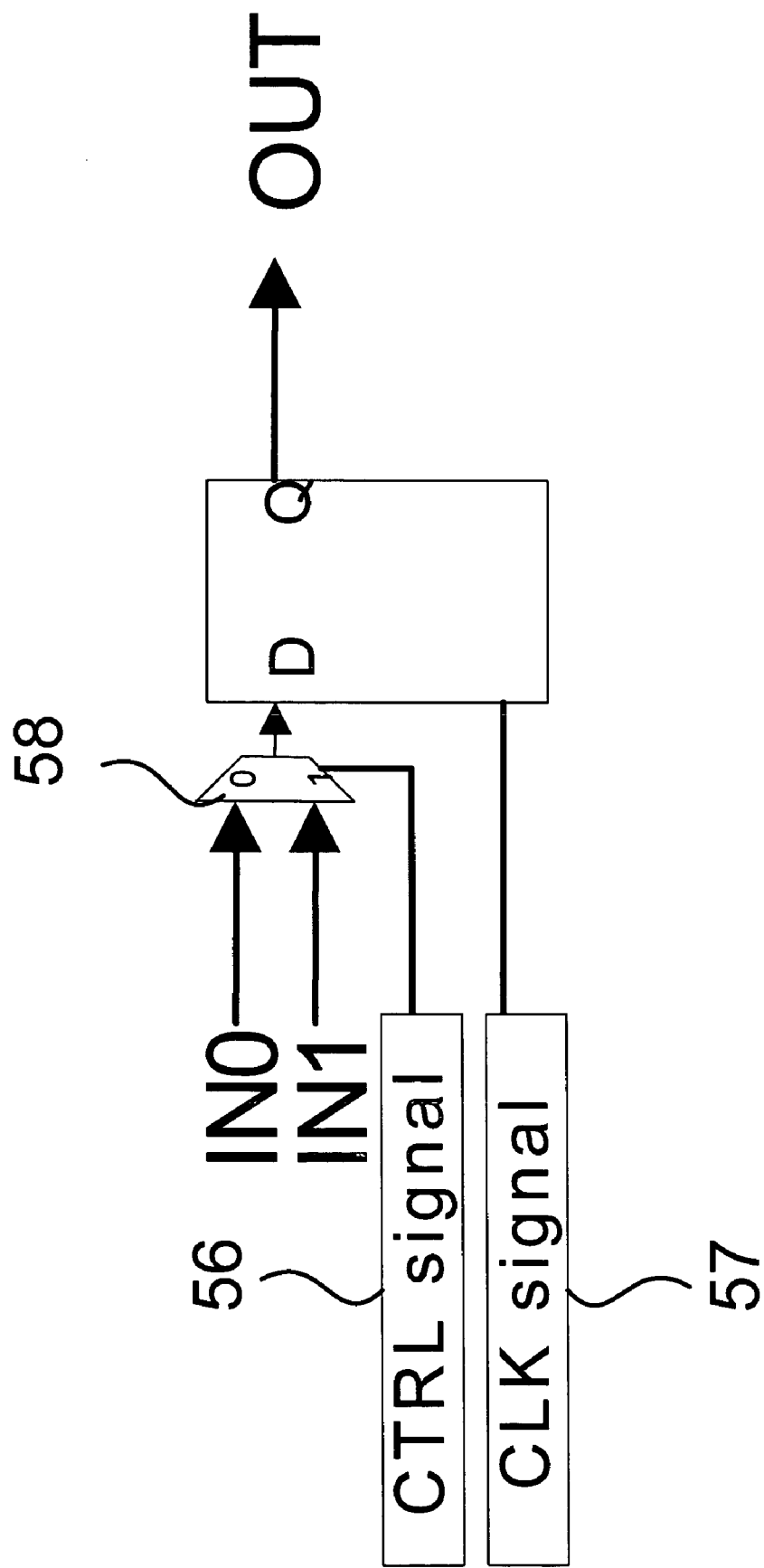
Figure 11:
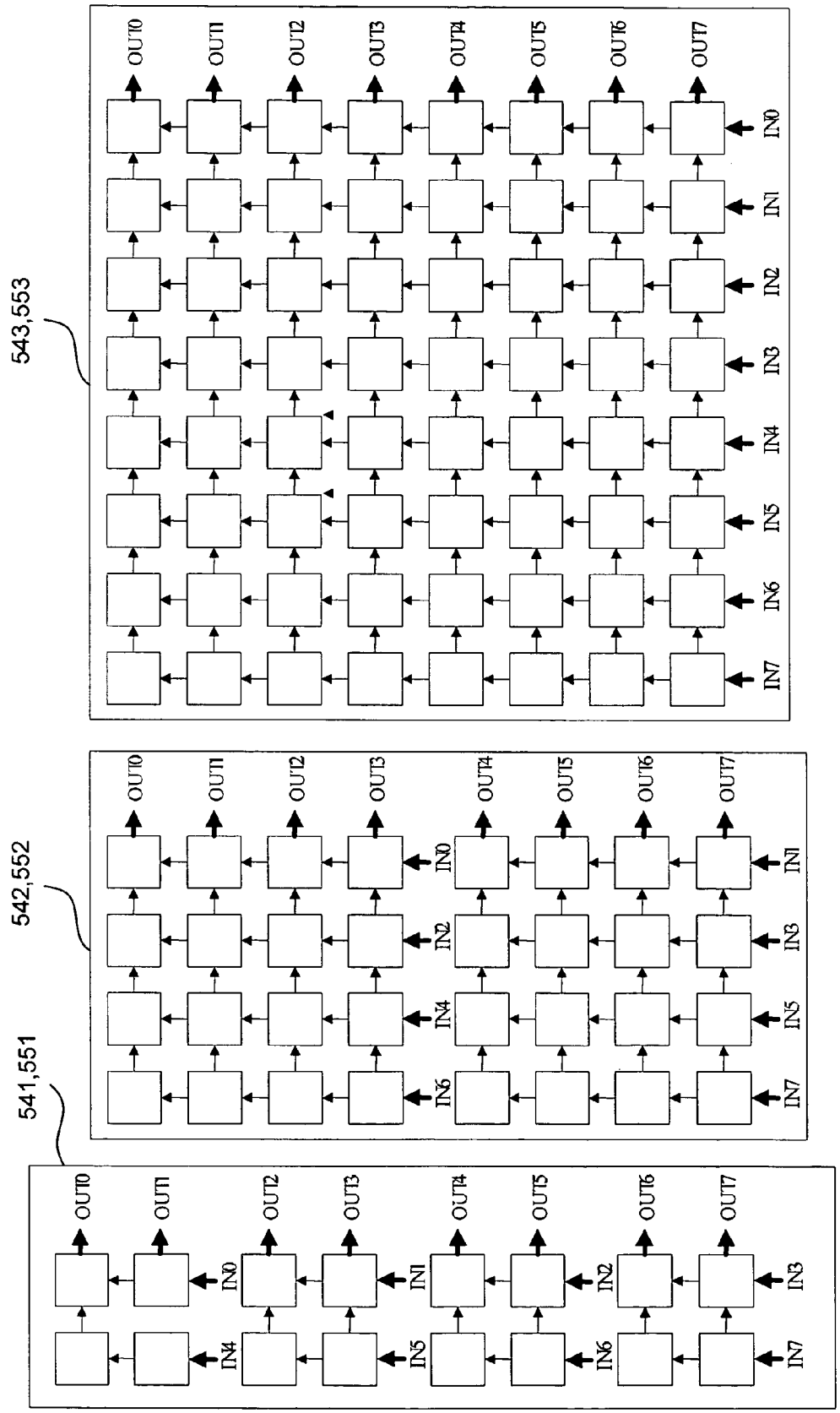
FIG. 11 is the view showing the block diagram of the RB_64 with various capacity.
Figure 12:
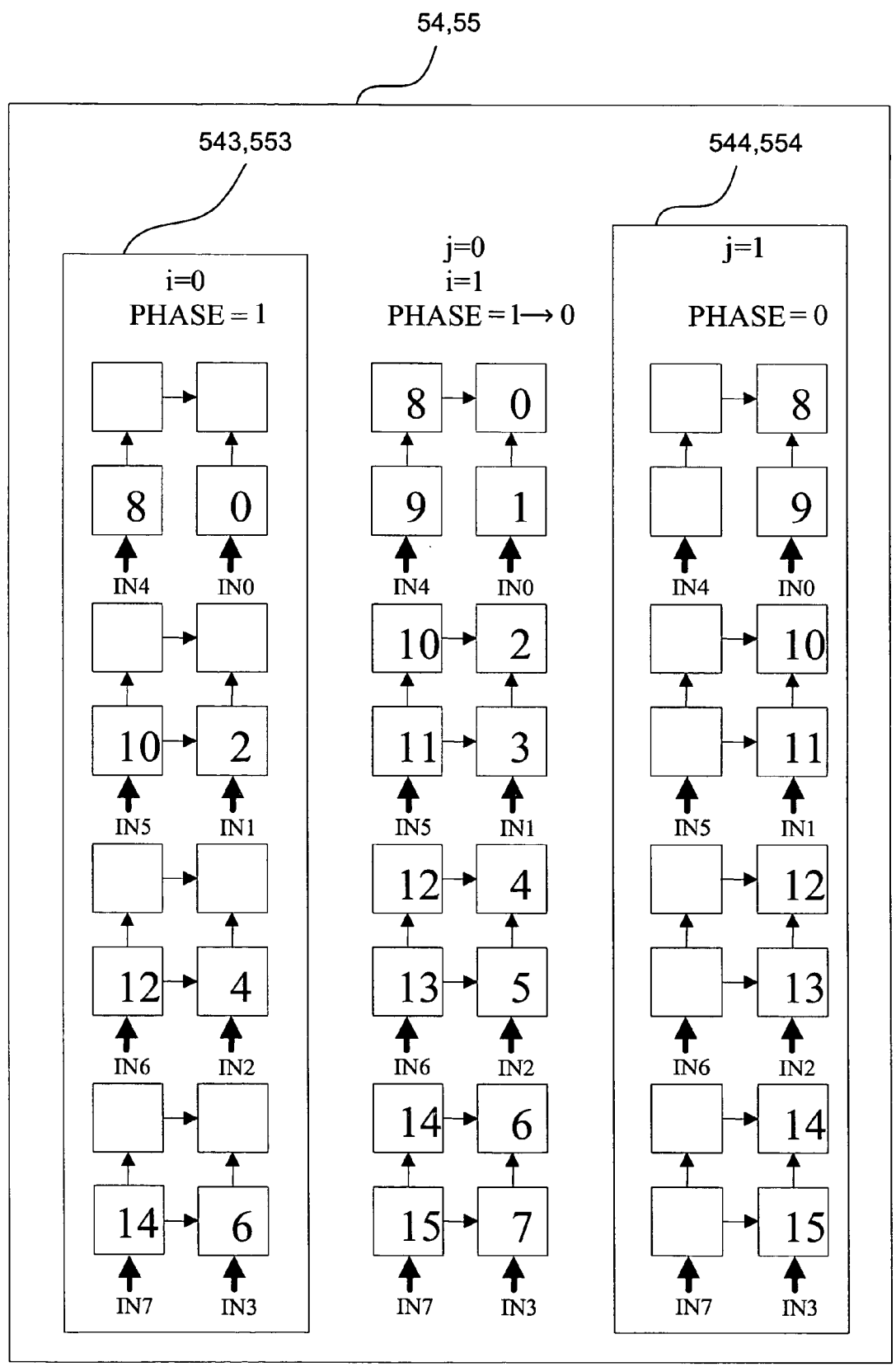
FIG. 12 is the view showing the data flow of the register bank for 16-word mode.

Also, in the design of the register banks [51, 52, 53, 54, 55], a two-input register based on a D flip-flop is used as in FIG. 9. A multiplexer [58] and another control signal, CTRL [56], are used for input selection. To control the data flow in the register banks [51,52,53,54,55], the clock signal, CLK [57], and the CTRL [56] signal are adjusted (as shown in FIG. 10). In the structure as shown in FIG. 1, registers banks [51,52,53,54,55] of RB_4096, RB_512 and RB_64 are required. Structures of the RB_4096 and the RB_512 is of the same type while RB_64 is of another. As shown in FIG. 2, the butterfly stage before RB_64 is a radix-8 butterfly stage while the stage after is a reconfigurable butterfly stage, which can be four radix-2, two radix-4, or one radix-8 butterfly. Referring to FIG. 4, the possible capacity of RB_64 may be of 16, 32, 64-word according to different FFT length. FIG. 11 shows the block diagrams for the three different modes of 16-word [541,551], 32-word [542,552] and 64-word [543,553].

For the fourth register bank [54] and the fifth register bank [55] with M-data capacity, it takes M/8 clock cycles for the fourth register bank [54] and the fifth register bank [55] to receive data from previous stage when there are 8 parallel data each clock cycle. During the input phase, the index of the incoming data at cycle i is i+(M/8)*k, where k=0~7 representing the index of one among the 8 words. During the output phase, the desired data ordering is J*(M/8)+k, where j is the output cycle count. Take the 16-word mode for example. Two cycles are required for the fourth register bank [54] and the fifth register bank [55] to receive data. During input phase [543,553] (PHASE=1), data from previous stage goes into the 8 dedicated input ports. For every cycle, the fourth register bank [54] and the fifth register bank [55] perform a shift-up operation. In other word, the two-input registers choose the data from downward. During output phase [544, 554] (PHASE=0), the fourth register bank [54] and the fifth register bank [55] perform a shift-right operation and the desired data are obtained at the output ports for every cycle. Therefore, PHASE signal is used to control the data flow in the butterfly. The PHASE signal is used as the CTRL signal [56] for every two-input register, to select the input data. Similar operation and data flow stands for the 32-word mode and the 64-word mode.

In order to deal with the various FFT modes, three different types of the first register bank [51], the second register bank [52], the third register bank [53], the fourth register bank [54] and the fifth register bank [55] are thus constructed. Hence, a 64-word structure performs in a 32-word or 16-word mode as long as input data are redirected to corresponding positions. The advantage of such a structure is that, when a certain register bank requires a smaller capacity, those unnecessary registers can be fully turned off since they have nothing to do with the correct data-flow operation.

The structure of the first register bank [51] (RB_4096), the second register bank [52] (RB_512) and the third register bank [53] (RB_512) are of the same type. As shown in FIG. 2, the butterfly stage before and after these register banks [51, 52,53] are butterfly stages of the first general butterfly [31] and the second general butterfly [32]. And the capacity changes from 128-word to 4096-word.

For M-data capacity, it takes M/8 clock cycles for the first register bank [51], the second register bank [52] and the third register bank [53] to receive data from previous stage when there are 8 parallel data for each clock cycle. During the input-phase, the index of the incoming data at cycle i is +(M/8)*k, where k=0~7 representing the index of one among the 8 words. During the output phase, the desired data ordering is $$\left[j / \left(\frac{M}{8^2}\right)\right] * \frac{M}{8^2} + j \, \% \left(\frac{M}{8^2}\right) + \frac{M}{8^2} * k,$$

where j is the output cycle count. Take the 128-word mode for example. The first register bank [51], the second register bank [52] and the third register bank [53] are a combination of 8 blocks and each input data enters one block separately, as in FIG. 15. FIG. 13A to FIG. 13F illustrate the data flow of 128 word mode. During the input phase, the bottom row of registers performs shift-right operation. For every 2 cycles, all rows of register bank perform shift-up operation in order to have next data come into the bottom row continuously. After 16 cycles, the first output data are ready at the output ports. In output phase, the register bank performs the shift-right operation to deliver output data for every cycle.

Figure 14:
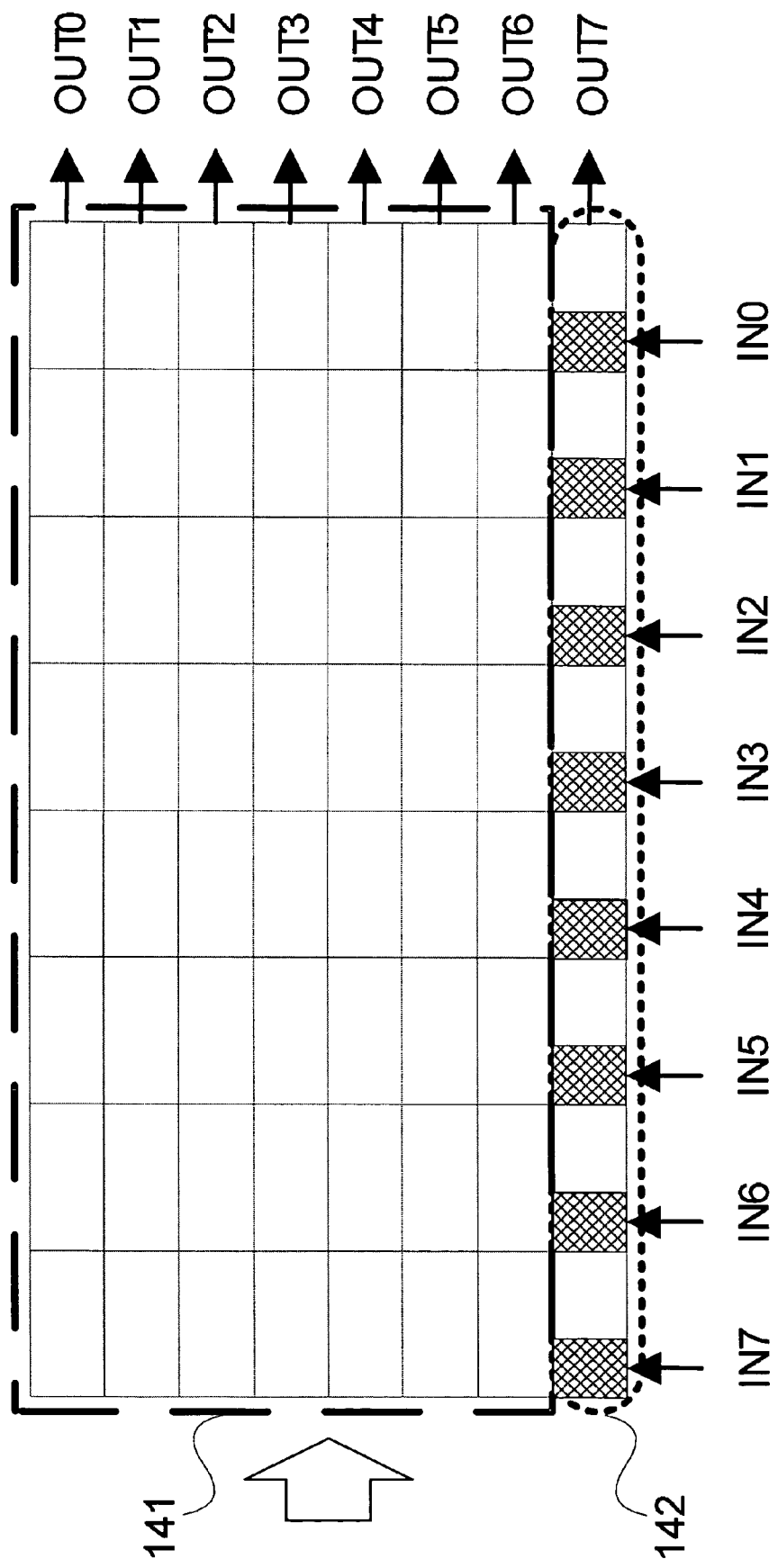
FIG. 14 is the view showing the control zones of the register bank.

The control signals of the above operations have a simple regularity too. Both the PHASE and CLK signals need to be considered. First, the register bank is divided into two control zones, as shown in FIG. 14, which are zone 1 [141] and zone 2 [142]. For the two input register in zone 1 [141], they share the same clock and use the PHASE signals the input select signal For registers in zone 2 [142], except for those at input ports, their input select signals are set to 0 in order to perform the shift-right operation all the time. Each of the 8 blocks has a dedicated input port. For registers at input ports, the PHASE signal issued as the input-select signal.

Based on the above scheme, a rule for the structure of this type of register module is obtained. The register module is consisted of 8 basic blocks, which are of the same structure and connected one after another; and, there are 8 rows of two-input registers in a basic block. When required registers have the capacity of M-data, the width of a basic block is (M/8²)-word. The control signals are the PHASE signal and two clock signals for the two control zones. The clock signals for zone 1 [141] toggle every (M/8²) cycle during input phase.

Figure 15:
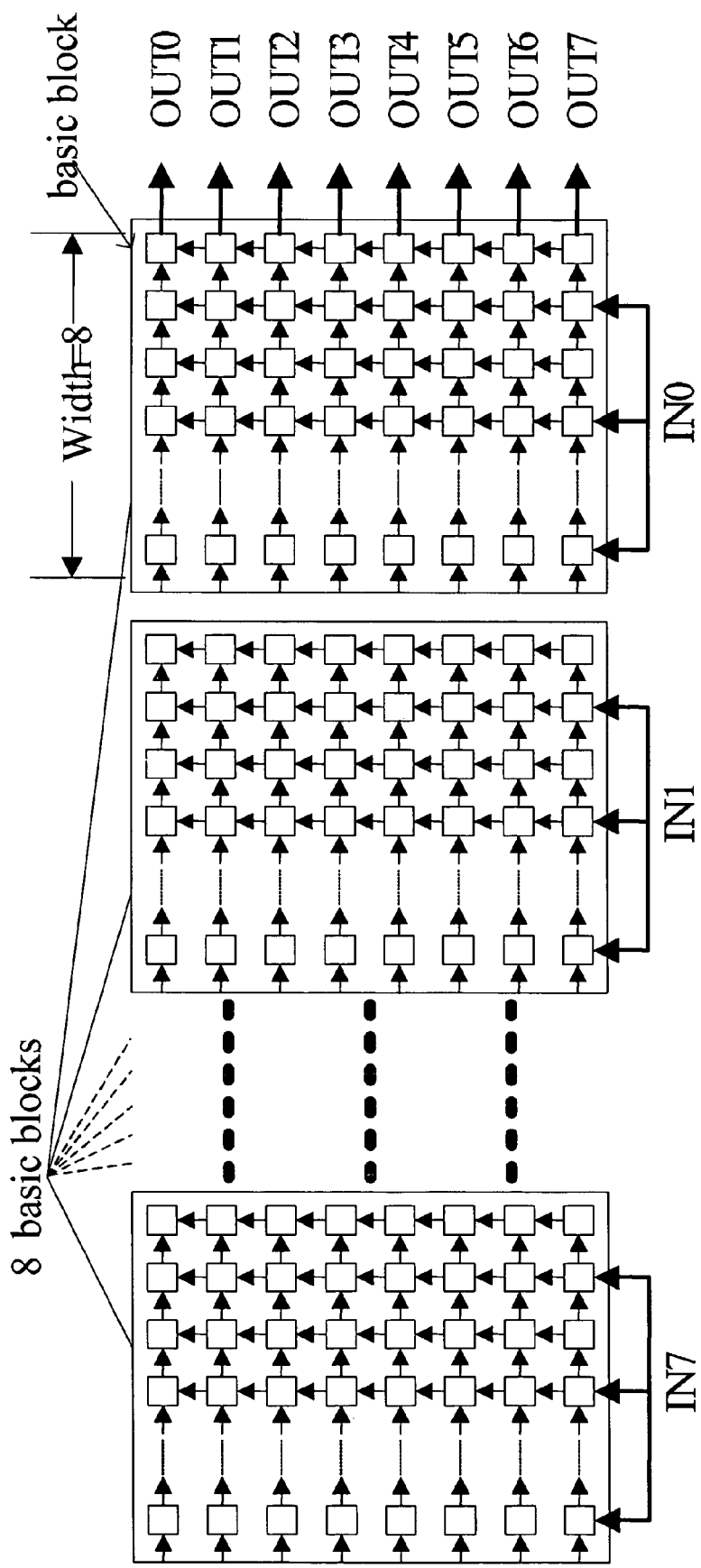
FIG. 15 is the view showing the block diagram of the reconfigurable RB_512.
Figure 16:
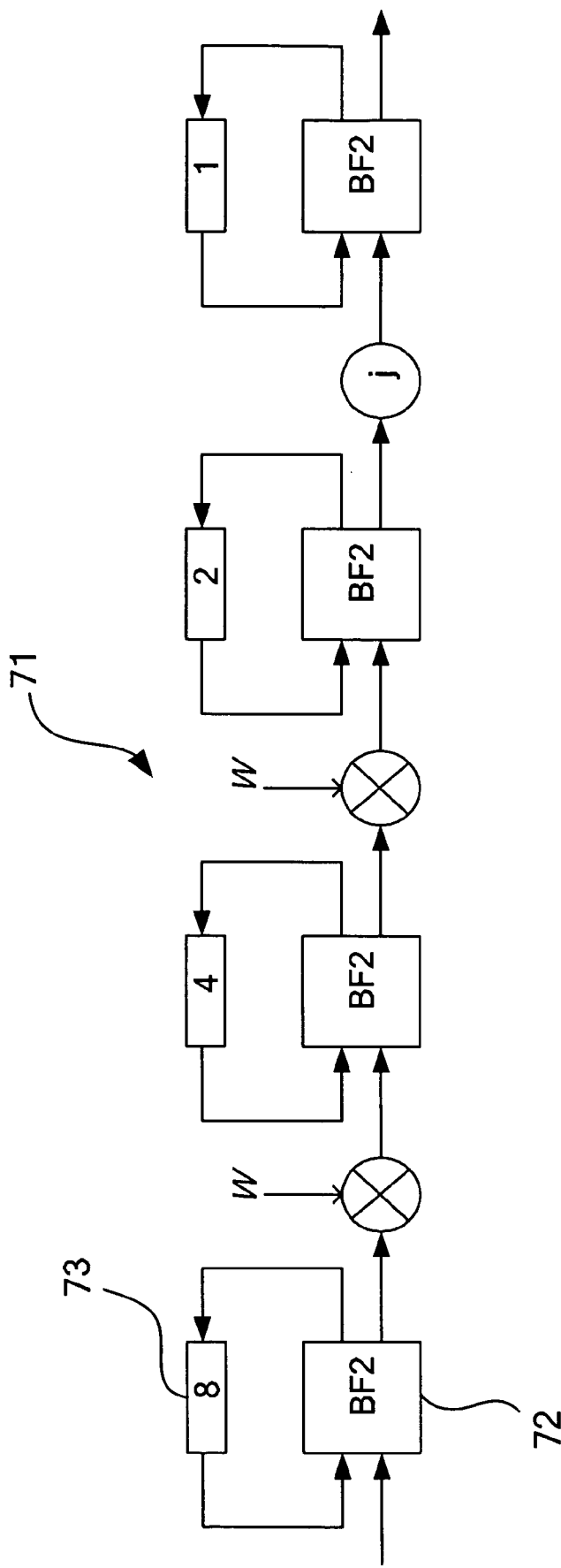
FIG. 16 is the structural view of the radix-2 SDF architecture.
Figure 17:
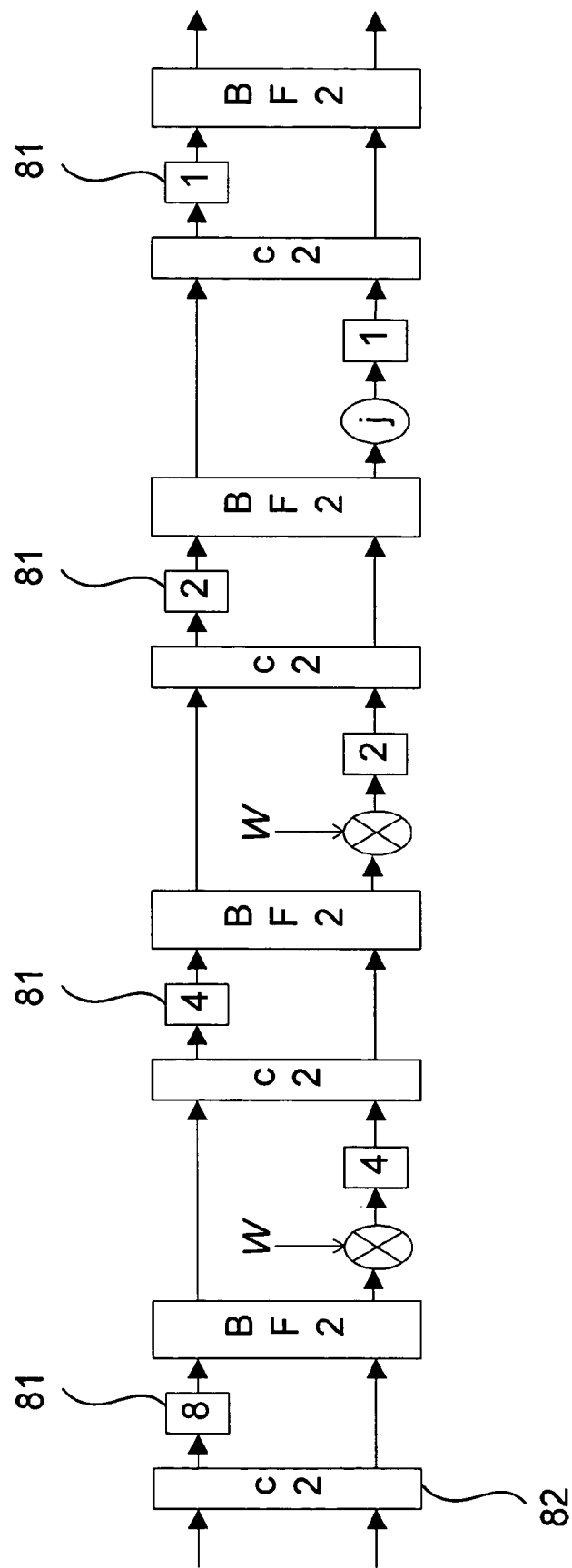
FIG. 17 is the structural view of the radix-2 MDF architecture.
Figure 18:
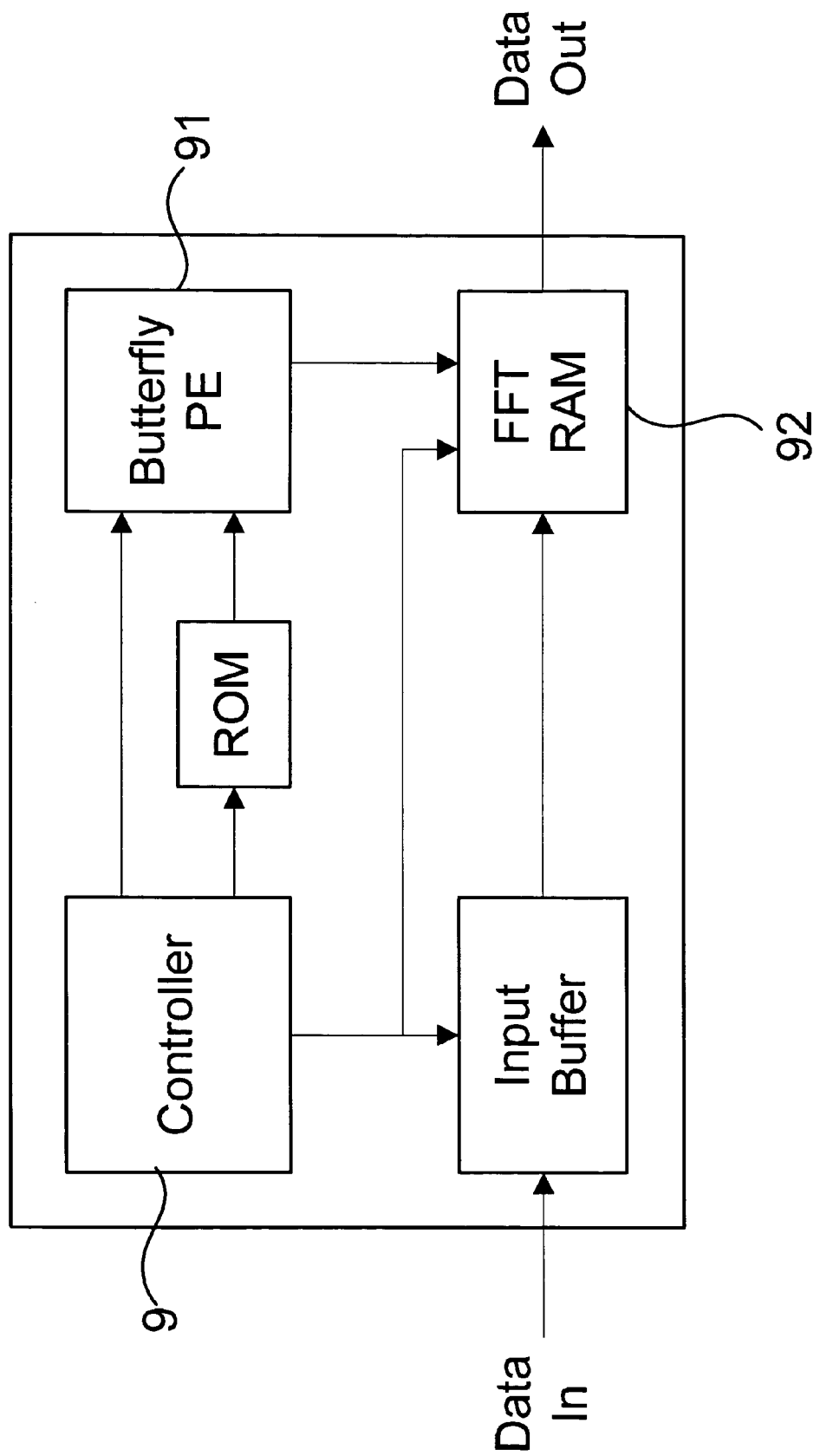
FIG. 18 is the structural view of the memory-based architecture.

As shown in FIG. 4, for different FFT length, the second register bank [52] and the third register bank [53] have the capacity of 128, 256, or 512-word and the first register bank [51] has the capacity of 1024, 2048, or 4096-word. Concerning the fourth register bank [54] and the fifth register bank [55] mentioned previously, a design of a reconfigurable register is still allowed FIG. 15 shows the block diagram of RB_512, which is permitted to be reconfigured as 128, 256 or 512-word. The basic block has a width of 8-word. The dedicated input for a basic block is connected to three different registers. For RB_512 to act as 128-word register bank, the input data goes into the right-most input register; and, the width of the basic block is effectively set to 2-word. The current column of the input register takes data from the output of a previous basic block at the meantime instead of a previous column. For the rest 6 columns at the left of the basic block, they are fully turned off since they have nothing to do with the correct data-flow operation. With this scheme, the mode of a reconfigurable block is changed simply by setting the corresponding input registers and modifying control signals.

In the above design of the register module, the register modules are not able to accept input data during output phase. This is because data flow in the register bank has a two-way direction; and, a serious error would occur if data is received all the time. Thus, the data flow has to be paused until the register module is again available, wasting lots of computation time. Hence two identical register modules are presented in a stage. When one register module is at output phase, the input data from previous stage goes into the other register module to be inputted. This go forth cycling.

To sum up, the present invention is a pipeline-based reconfigurable mixed-radix FFT processor, where an N-point FFT is decomposed into at most four computation stages to save computing time and hardware cost through using a first general butterfly, a second general butterfly and a reconfigurable butterfly while the first general butterfly is reused.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A pipeline-based reconfigurable mixed-radix fast Fourier transform (FFT) processor, comprising:
   a first commutator that receives incoming data;
   a first multiplexer connected to the first commutator;
   a first general radix-8 butterfly performing an 8-point discrete Fourier transform (DFT) operation and connected to the first multiplexer;
   a multiplier connected to the first general butterfly;
   a memory unit connected to the multiplier;
   a first register bank connected to the multiplier and to the first multiplexer and storing and switching internal data and wherein the first multiplexer multiplexes the first commutator and the first register bank to the first general butterfly;
   a first Block Floating Point (BFP) unit connected to the first register bank wherein data is partitioned into non-overlapping blocks and wherein the blocks are normalized and a fixed-point computation is performed where execution of a given block is not started until execution of a supplying block is finished;
   a second register bank connected to the multiplier and storing and switching internal data;
   a third register bank connected to the multiplier and storing and switching internal data;
   a second BFP unit connected to the second register bank and to the third register bank wherein data is partitioned into non-overlapping blocks and wherein the blocks are normalized and a fixed-point computation is performed where execution of a given block is not started until execution of a supplying block is finished;
   a second multiplexer connected to and multiplexing the second register bank and the third register bank;
   a third multiplexer connected to and multiplexing the first commutator and the second multiplexer;
   a second general radix-8 butterfly performing an 8-point DFT operation and connected to the third multiplexer;
   a coefficient multiplier connected to the second general butterfly;
   a fourth register bank connected to the coefficient multiplier and storing and switching internal data;
   a fifth register bank connected to the coefficient multiplier and storing and switching internal data;
   a third BFP unit connected to the fourth register bank and to the fifth register bank wherein data is partitioned into non-overlapping blocks and wherein the blocks are normalized and a fixed-point computation is performed where execution of a given block is not started until execution of a supplying block is finished;

a fourth multiplexer connected to and multiplexing the fourth register bank and the fifth register bank;

a reconfigurable butterfly configurable as a radix-2, a radix-4, or a radix-8 butterfly and connected to the fourth multiplexer; and a second commutator connected to the reconfigurable butterfly and outputting an N-point mixed radix FFT of the incoming data wherein the processor decomposes the N-point FFT into four or fewer sub-FFTs having points, wherein a number of the points is a power of 2 and wherein N is the multiplication product of the number of the points and wherein parts having a higher radix are executed earlier than parts having a lower radix.

2. The processor according to claim 1, wherein a two-input register based on a D flip-flop is used in the first register bank, the second register bank, the third register bank, the fourth register bank and the fifth register bank.

3. The processor according to claim 1, wherein data flow in the first register bank, the second register bank, the third register bank, the fourth register bank and the fifth register bank has a direction decided by a clock signal and a control signal inputted.

4. The processor according to claim 1, wherein the reconfigurable butterfly comprises a radix-2 butterfly.

5. The processor according to claim 1, wherein the reconfigurable butterfly comprises a radix-4 butterfly.

6. The processor according to claim 1, wherein the reconfigurable butterfly comprises a radix-8 butterfly.

* * * * *